(12) United States Patent
Wilhelm et al.

(10) Patent No.: US 7,239,706 B1
(45) Date of Patent: Jul. 3, 2007

(54) TRANSCODER FOR DECODING ENCODED TV PROGRAMS

(75) Inventors: Siegfried Wilhelm, Munich (DE); Bernd Kowalski, Siegen (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/485,408

(22) PCT Filed: Jul. 16, 1996

(86) PCT No.: PCT/EP98/04424

§ 371 (c)(1),
(2), (4) Date: Feb. 7, 2000

(87) PCT Pub. No.: WO99/08446

PCT Pub. Date: Feb. 18, 1999

(30) Foreign Application Priority Data

Aug. 6, 1997 (DE) ................................ 197 34 071

(51) Int. Cl.
*H04N 7/173* (2006.01)
*H04N 7/167* (2006.01)

(52) U.S. Cl. ...................................... 380/240; 380/227

(58) Field of Classification Search ................ 380/240, 380/227

See application file for complete search history.

(56) References Cited

U.S. PATENT DOCUMENTS 5,029,207 A * 7/1991 Gammie .................... 380/228
5,534,913 A * 7/1996 Majeti et al. ................ 725/114

FOREIGN PATENT DOCUMENTS

| DE | 94 17 937 | 4/1995 |
|----|-----------|--------|
| GB | 2 304 217 | 3/1997 |
| WO | 96 32702  | 10/1996 |
| WO | 97 20431  | 6/1997 |

OTHER PUBLICATIONS

Bauer et al., "Integrated Security for Digital Video Broadcast," IEEE Transactions on Consumer Electronics, Bd. 42, Nr. 3, Aug. 1996, pp. 500-503.

* cited by examiner

*Primary Examiner*—Taghi T. Arani

(74) *Attorney, Agent, or Firm*—Kenyon & Kenyon LLP

(57) ABSTRACT

A decoder device has a control unit for decoding encoded TV programs. The decoder device has an input for entering an encoded TV program, a decryption device for decoding an encoded TV program into a format which can be played on a television set, an output which can be connected to the television set and is designed to enter the encoded TV program into the television set for play, an interface for an identification or key component, to be used for validation of the decoding device, as well as an interface for a control unit. The interface for the identification or key component is located in the control unit.

8 Claims, 4 Drawing Sheets

TRANSCODER FOR DECODING ENCODED TV PROGRAMS

FIELD OF THE INVENTION

The present invention relates to a decoder device for decrypting encrypted television programs. In particular, the present invention relates to a decoder device having a control unit, for the decryption of encrypted television programs, having an input for feeding in an encrypted television program, a decryption device, which decrypts an encrypted television program into a format that can be reproduced by a television receiver, an output, which can be connected to a television receiver in order to feed the decrypted television program into the television receiver for reproduction, an interface for an identification and/or key carrier component for enabling the decryption device, and an interface for a control unit of the decoder device.

RELATED TECHNOLOGY

A decoder device for decrypting encrypted television programs enables the reception and decryption of so-called pay TV programs, present-day decoder devices being commercially available as so-called set-top boxes for conventional television receivers.

The invoicing that has been customary heretofore, for example monthly invoicing, for supplying programs in pay TV is shifting more and more to an individual ("pay-per-view") invoicing practice. Therefore, there is a need to identify and authenticate the program customer before the program customer accesses the program. In addition, in the case of so-called HOT programs (home order television), the program customer's orders are also debited to said customer's bank account or his credit on a smart card. Here, too, it is necessary to identify and authenticate the program customer and, when needed, implement security mechanisms to protect against misuse.

To secure electronic invoicing processes, and to protect confidential information (bank account data, account balances, etc.), use is made of smart cards having microprocessors which are equipped with encryption algorithms. An encryption algorithm of this type is the so-called RSA algorithm. In the case of pay TV, a smart card of this type is part of the so-called "conditional access system" (CAS), which is used to check whether the person making the inquiry is actually the authorized program customer and, if applicable, whether his creditworthiness suffices for the desired service. In so-called "electronic commerce", as well, this smart card represents the identity of the customer or of his electronic purse. In this context, a replenishable credit can be recorded on the smart card. The smart card is generally accessed, in a more or less automated manner, by third parties (program providers, commercial entities or the like), via telephone or the internet, using the set-top box before or during the transaction.

A growing problem in this connection is the rising number of program or service providers which a program customer can subscribe to via these media. The result is an ever increasing outlay for equipment (set-top box, television set, internet terminal (PC or net PC), remote control units for the set-top box and the television set, as well as an ever increasing number of smart cards needed to utilize the individual services.

SUMMARY OF THE INVENTION

An object of the present invention is, therefore, to provide these various components less expensively, i.e., to reduce their hardware outlay, and so that they are less susceptible to faults and simpler for the program customer to handle. Moreover, the present invention addresses the problem of security which is becoming increasingly relevant, in connection with services being utilized by unauthorized third parties.

The present invention provides a decoder device which includes an interface for the identification and/or key carrier component in the control unit of the device.

This design makes it possible to reduce the number of interfaces. Moreover, the program customer (user) is able to carry out his transactions in a more convenient manner, since the control unit of the decoder device is already equipped with a keypad in any case. Furthermore, security is improved, since the program customer (even among a relatively large number of third parties) can effect his inputs (PIN, TAN, etc.) without third parties being able to observe this. Moreover, the control unit of the decoder device can be kept securely, together with the identification and/or key carrier component (smart card), whereas, as a rule, for the sake of convenience, a smart card is not removed from the decoder device (set-top box).

In accordance with one preferred embodiment of the decoder device having a control unit in accordance with the present invention, the control unit is also set up for controlling the television receiver set, which has an interface for receiving control commands from the control unit. This constitutes a further reduction in equipment outlay. Moreover, overall access to the television receiver set can be controlled. In other words, even television use for programs that do not involve payment must be enabled by the authorized user. This can be achieved by having the function of the control unit as a whole depend on the authorized user inputting the identifier (PIN).

In order for the program provider to handle debiting and to identify the program customer, in the case of the decoder device according to the present invention, use is made, in particular, of an interface to a telecommunications network. This can be a modem, or a corresponding coupling device for digital telecommunications networks.

In particular, to enhance security in the system, an interface to an identification and/or key carrier component is used. Via such an interface to a telecommunications network, the program customer can make contact with a service provider or merchandise shipper. Here as well, a connection to a specific subscriber (service provider or merchandise shipper) via the telecommunications network is established as a function of an authorization by the identification and/or key carrier component. The program provider is thus considered independently of the service provider or merchandise shipper, when the program customer is invoiced. This can be advantageous with respect to data security and flexibility.

Alternatively, however, it is also possible that the program provider and the service provider cooperate in a suitable fashion, making it possible to have a shared invoicing and/or customer administration, as well as customer identification and customer authorization. In such a case, there is no need for separate smart cards.

At any rate, it is advantageous for the interface to the identification and/or key carrier component for the authorization of the connection via the telecommunications network to also be arranged in the control unit.

As already mentioned, the identification and/or key carrier component for the authorization of the connection via the telecommunications network and the identification and/or key carrier component for enabling the decryption device can be implemented either by two separate or by one common smart card.

In a further refinement, the decoder device is provided with an interface for connecting the decoder device to a computer, which is set up for controlling the decoder device and/or for establishing a connection to another subscriber via the telecommunications network. It is, thus, possible to make available to the program customer the entire functionality of a computer (PC or internet PC), i.e., the storing and processing of data and information, as well as the more convenient configuration of dialogs between the program customer and, for example, the program provider or the service provider.

In one embodiment of the present invention, the control unit is formed by the computer, which has an interface for controlling the decoder device, and an interface for the identification and/or key carrier component for authorizing the connection via the telecommunications network and/or the identification and/or key carrier component for enabling the decryption device. This eliminates the need for one or two separate control units. It goes without saying that in this specific embodiment as well, the two smart cards for the traffic with the program provider and the service provider can also be realized as one common smart card.

It should also be mentioned that the connection between the computer and the television set, or the computer and the decoder device, can either be wire-free (for example, an infrared or ultrasonic connection) or wire-based. In addition, the not very stringent demands placed on the computer (relatively small memory, no need for an especially ergonomic keyboard due to mostly short inputs, etc.), mean that a so-called palmtop design is possible, with the appropriate interfaces (infrared interface to the decoding device of one such or more interfaces for the smart card(s)). Thus, the user is able to control and operate his equipment in a very compact and convenient manner, and also simply and conveniently communicate with the program provider and/or the service/merchandise provider. Finally, there is also a substantial reduction in the outlay for cabling between the individual components at the user end, which likewise enhances the convenience.

One embodiment of the present invention provides for the decoder device to be integrated in the television set. The user is thus provided with a self-contained apparatus which is especially protected against misuse, and in which all of the functions (conventional television, pay TV, communication with a service/merchandise provider via the telecommunications network, storage and/or post-processing of the received data in the computer, etc.) can be performed in a manner in which they are protected from misuse.

The present invention also provides a smart card for an above-described decoder device with a control unit, having a computer unit, a first memory area, in which are stored at least parts of operating system functions which are used to control the communication between the computer unit of the smart card and the peripherals of the smart card, as well as the communication with an external host computer, and which are used to manage protected, unprotected and/or read/write memory areas of the smart card, and having a second memory area, which is subdivided into protected and unprotected areas, access to protected areas being made as a function of a check for permitted access, a general key being stored in the protected area of the second memory area, and under the control of the general key, the external host computer entering at least one further simple key, as well as a protocol program associated with this further simple key.

This smart card makes it possible for the decoder device described above to be operated quite securely and also simply, thereby expanding the access to a plurality of additional service providers.

Preferably stored in the second memory area is a key management, from which access is made to a protocol program of a simple key.

In this context, the following method according to the present invention is used to supplement additional keys, i.e., ways of accessing additional providers:

- a telecommunications connection is established by the host computer between the host computer and the decoder device with the control unit or the computer containing the control unit;
- the host computer checks the general key in the smart card;
- a simple key, as well as a protocol program associated with the key are communicated to the smart card in encrypted form, in the case that the check test has a positive result;
- the simple key and the protocol program associated with the key are entered into the protected memory area of the smart card; and
- the protected memory area of the smart card is inhibited.

In this context, before the simple key and the protocol program associated with the key are entered into the protected memory area of the smart card, the key and the protocol program can be decrypted by the computer unit of the smart card.

DETAILED DESCRIPTION

Figure 1:
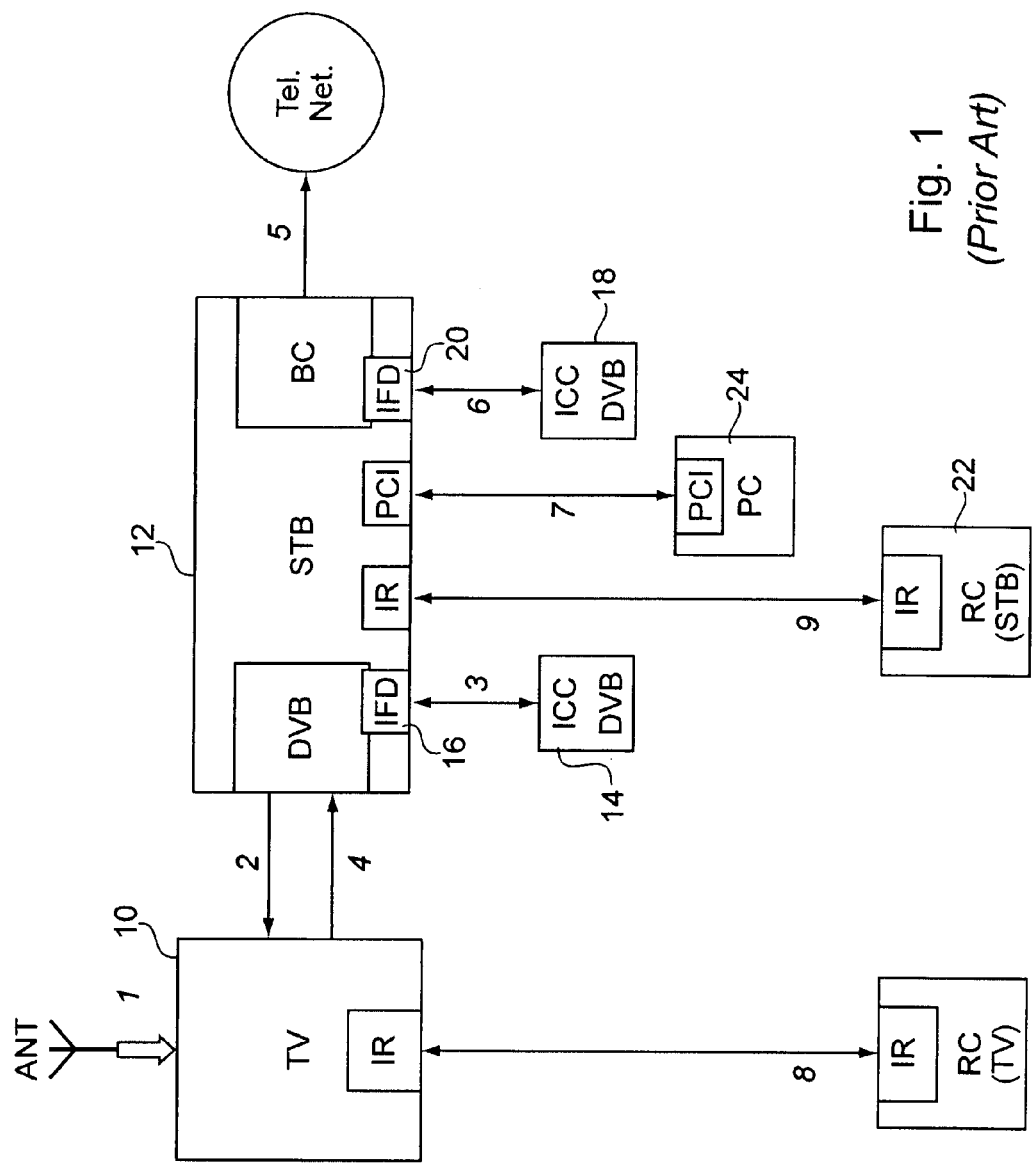
FIG. 1 shows a prior art decoder device arrangement in a schematic block diagram.

FIG. 1 illustrates terminal environment for combined pay TV and electronic commerce applications that is customary today. The broadband, digitally encrypted pay TV useful signal is received by the television set 10 via line 1 and transferred via output 4 to input IN (not shown), into set-top box (STB) 12. There, the signal is decrypted by a special chip using an algorithm provided for this—the DVB algorithm is mentioned here as being representative of all such algorithms—and retransmitted to the television set. The keys are set by a smart card (ICC DVB) 14 via interface 3. The smart card contains the key-distribution algorithm of the conditional access system (e.g. RSA) and the customer's secret key. Only a customer having a valid smart card 14 is able to decrypt pay TV broadcasts. The smart card 14 is connected to set-top box 12 via smart card interface (IFD) 16.

Enhancements to set-top box 12 envisage connecting a backward channel via the telephone network or internet via interface 5 to the servers of various service providers, e.g., for ordering services or goods advertised on the pay TV channels. To safeguard the order and payment, a second smart card (ICC BC) 18 can be inserted in this case via a further interface (IFD) 20, establishing connection 6 between second smart card 18 and second interface 20.

Other possible enhancements for linking set-top box 12 envisage using an IR remote control 22 via interface 9 and a computer (PC) 24 via an interface 7 that is customary in the PC environment, referred to here simply as "PCI" (e.g., V24/RS232C or parallel interface). The computer 24 facilitates, for example, user-friendly backward channel transactions or the post-processing of information from the pay TV channels.

There are various ways to connect smart cards 14 and 18 to set-top box 12. Either smart card interfaces 16 and 20 are permanently installed in set-top box 12, or they are designed to be insertable as PCMCIA modules. PCMCIA modules make it possible to exchange one pay TV access method (CAS) for another without any intervention in set-top box 12.

Disadvantages associated with conventional terminal configurations include the lack of user-friendliness, the elaborate cabling of set-top box 12, and its complicated interface configuration.

Figure 2:
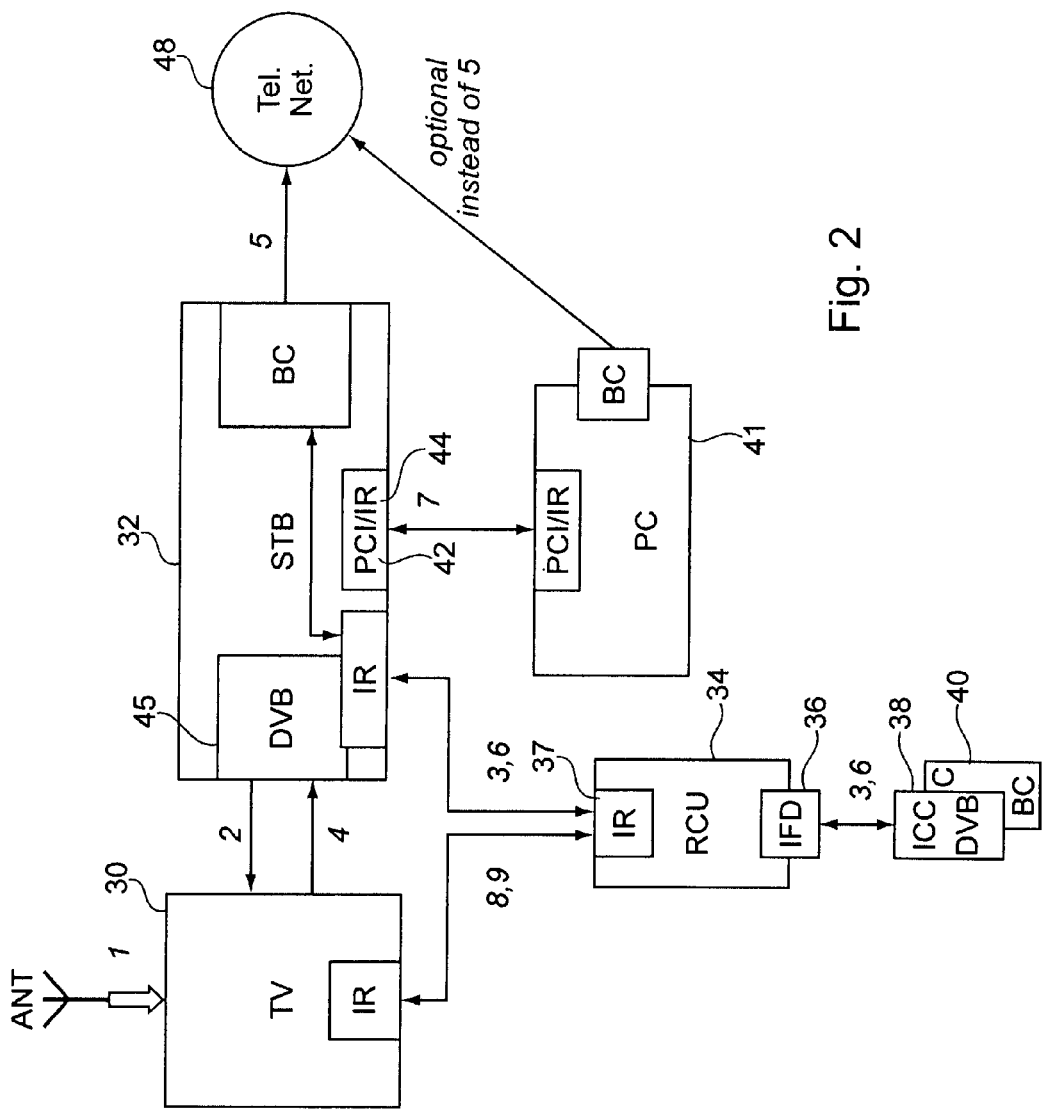
FIGS. 2 through 4 show various embodiments of a decoder device arrangement according to the present invention, each in a schematic block diagram.
Figure 3:
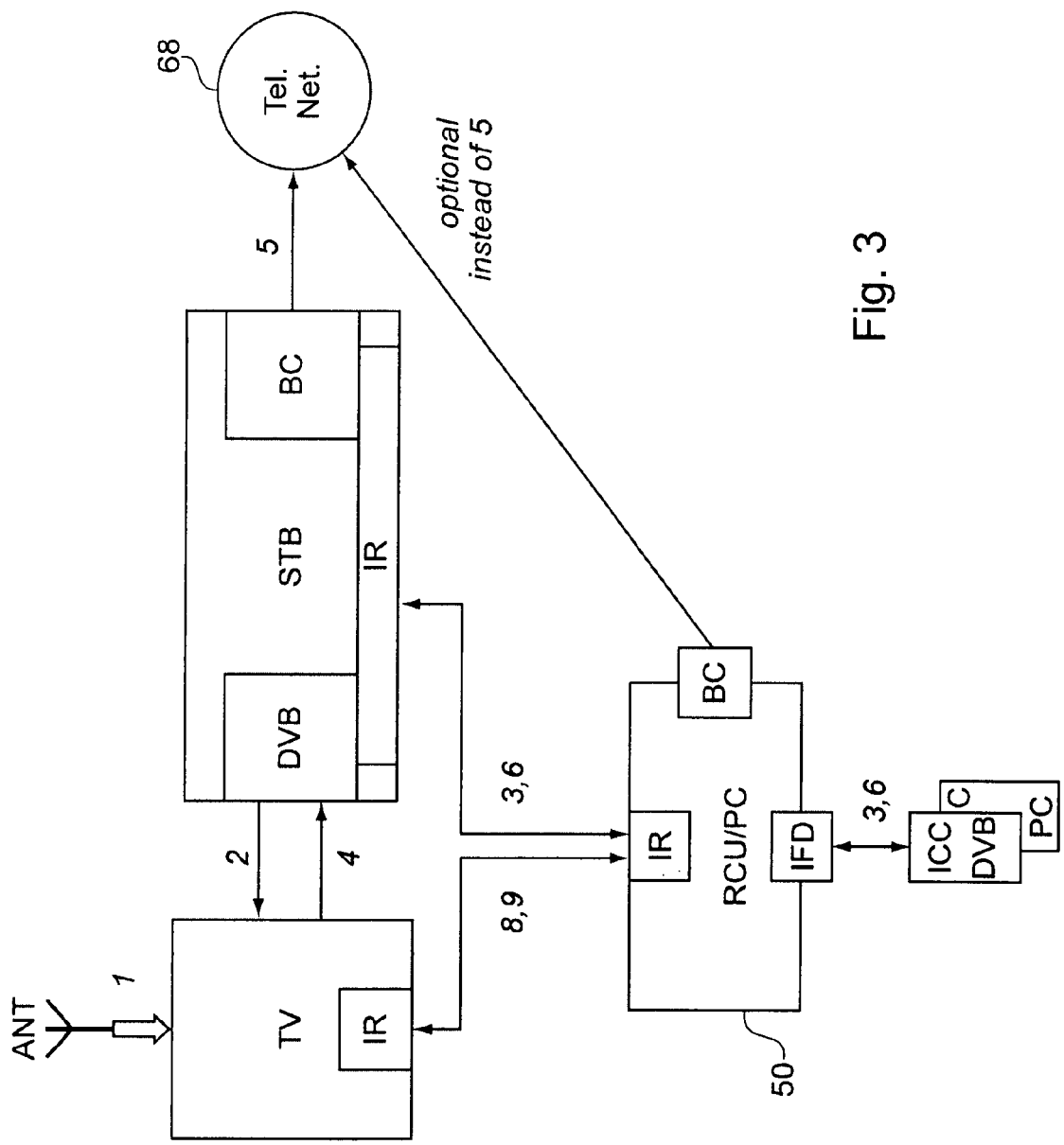
Figure 4:
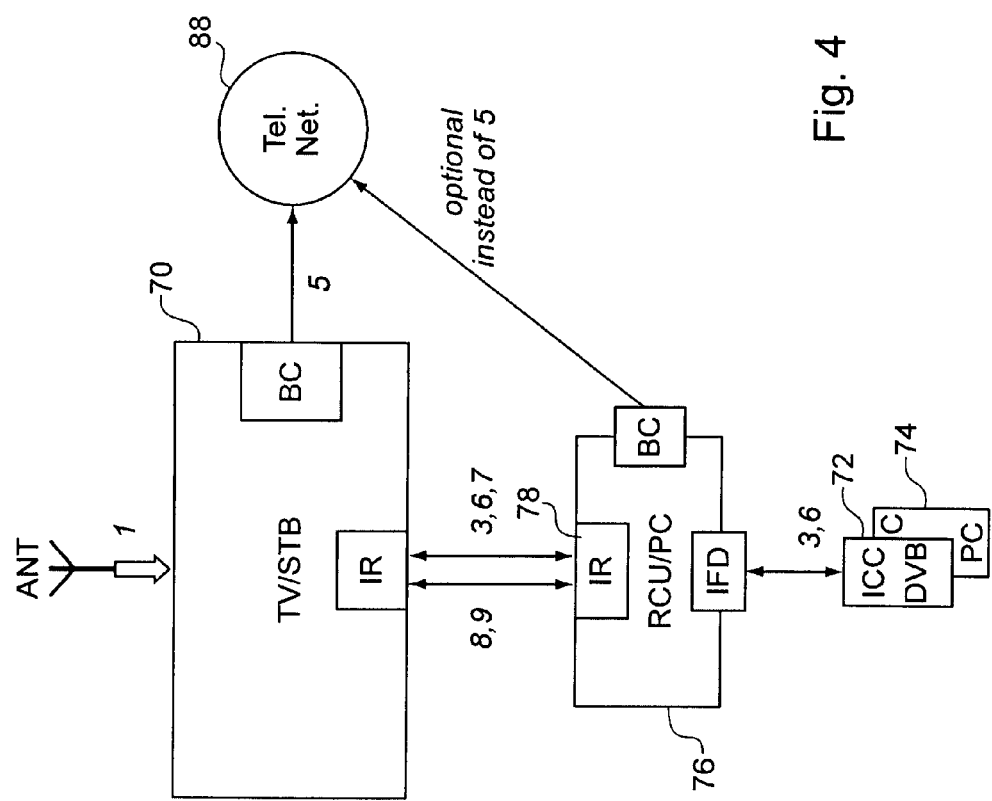

Specific embodiments of the present invention are illustrated in FIGS. 2, 3 and 4.

Referring now to FIG. 2, the remote controls of set-top box (STB) 32 and of television set (TV set) 30 are combined in one device, control unit (RCU) 34, already in a first integration stage. The new control unit 34 receives a smart card interface 36, capable of driving both smart card (ICC DVB) 38 of the pay TV system, as well as smart card (ICC BC) 40 of the backward channel. In terms of the functional sequence, the key exchange of the conditional access system (CAS) of the pay TV is carried out exactly as in the conventional configuration.

In FIG. 2, however, an IR interface 37 links smart card 38 via control unit 34 to the pay TV decryption chip 45 (e.g., DVB) in set-top box 32. The same applies to smart card 40, which, at this point, likewise safeguards the backward channel via control unit 34 and its IR interface.

It is, therefore, no longer necessary to insert smart cards into set-top box 32, eliminating the need for any smart card interfaces at the set-top box 32. The customer inserts his cards directly into the remote control 34. If pay TV providers and backward channel service providers agree contractually to this effect, then the functions of both smart cards 38 and 40 can even be combined on a single smart card (ICC).

In FIG. 2, the computer (PC) 41 either continues to be connected to set-top box 32 via a conventional interface (PCI) 42 or likewise utilizes the IR interface (infrared interface) 44 of set-top box 32 for this purpose.

The backward channel connection to the telecommunications network is effected either via set-top box 32 or via the computer 41. Both variants are possible in principle.

FIG. 3 shows remote control (RCU) and computer (PC) combined in a further integration stage into a combined apparatus (RCU/PC) 50. Here, one can utilize the advantages of the computer PC and of remote control (RCU) simultaneously. This approach is of particular interest when the combined apparatus 50 is similar to a "network PC" and can be operated compactly and without complicated peripherals and cabling, e.g., from the coffee table.

FIG. 4 illustrates the television set (TV set) and set-top box (STB) combined in just one terminal 70, as a further integration stage.

The new terminal configurations illustrated in FIGS. 2 through 4 show how one can appreciably simplify the operation and cabling of the terminals without degrading functionality.

Therefore, in accordance with the present invention, instead of one or more smart card interfaces on the set-top box (STB), the relevant smart cards are now connected via a remote control (RCU) 76 and its infrared interfaces 78 to the pay TV decryption chip remaining in set-top box 70. Thus, the need is eliminated for costly and delicate interfaces on the set-top box.

Moreover, the functions of the pay TV smart card and of the backward-channel smart card can be combined in a user-friendly manner on just one card, with the assistance of a special remote control RCU.

Finally, combining the remote control and the PC in combined apparatus 76 makes it possible to move the backward channel connection out of the set-top box 70. This makes it possible to optimally utilize an internet PC (a PC which is linked via any desired online networks to servers of any desired service providers), in conjunction with pay TV services, including their backward channel options.

A further aspect of the present invention is configuring the smart card so that it, too, can handle, with a high level of security, both the decryption of the program of the pay TV provider and transactions (ordering and payment of purchase price) with the goods/service provider.

In particular, if further goods/service providers are added over time, this means in each case that the program customer needs a new smart card containing the keys and protocols of the previous providers (both pay TV providers and goods/service providers) and the key and the protocol of the newly added provider.

The present invention likewise provides an approach for this:

Since the goods/service provider is linked in any case, as a rule, to the user by the same host computer as the pay TV provider, this host can also access the inhibited areas of the customer's smart card by a general key, in order to store there a further key and the associated protocol for future transactions (decryption or payment processes).

Moreover, a vector table or an interrogation routine, in which the newly added keys are successively managed, is to be executed in an additional area (possibly likewise inhibited). In response to a smart card access, it is first checked on the basis of the vector table or the interrogation routine to see whether an appropriate key is present, or whether the key input by the user matches one of the keys stored on the smart card. Only when this interrogation has a positive result, is the program associated with the respective key (if indicated, decrypted and then) executed for the purpose of transaction or decryption.

The key and the associated protocol (program) are preferably likewise transmitted in an encrypted form, from the host computer to the set-top box 32, 70 and, from there, routed via the interface to the control unit 34, 50, 76. When the control unit is integrated with computer (PC) as combined apparatus 50, 76, the host computer can be directly linked to the computer (PC) via the telecommunications network 48, 68, 88, to transmit the information for, or into, smart card 38, 40, 72, 74.

Depending on the specific configuration, it is possible for the protocol (program) to be stored in the smart card just in an encrypted form, and for it to be decrypted in each case for the delay prior to execution. Alternatively, however, the protocol (program) can also be rendered in an executable form when it is stored in the (protected) memory area of the smart card.

As a result, the memory of the smart card contains (inter alia) the following programs and/or data:

An operating system core for controlling communications between the smart card processor and the peripherals on the smart card, as well as communications with the host computer which manages the memory areas of the smart card (protected and unprotected areas, read/write areas, flash EEPROM, etc.), etc. Keys (a master or general key, and also one or more application keys), the master key being used to transfer (further) application keys and the associated application or protocol programs into the memory area. The application keys ensure that the protocol programs are executed (and thus orders handled or pay TV programs decrypted) only in response to proper user input.

Encrypted user programs or protocol programs for controlling the handling of orders or the decryption of pay TV programs.

To enhance security, provision is made for the identification and authentication between the control unit 34, 50, 76 and/or the set-top box 32, 70 or television set 30, 70, on the one hand, and the host computer, on the other hand, to be carried out on different routes or channels. In other words, some of the protocol traffic is transmitted via interface 5 to the telecommunications network 48, 68, 88, and some via line 1, together with or prior to the broadband, digitally encrypted pay TV useful signal. In this context, the enabling/inhibiting of services can also take place on these routes. Since a case of misuse would require synchronously intercepting and decrypting both channels, security is thus considerably higher. In particular, information can be distributed between the two channels at the time of enabling/inhibiting, or of new keys, etc., in such a way that it is able to be decrypted only in an alternating and also only in a step-by-step manner, in each instance, with knowledge thereof.

The invention claimed is:

1. A decoder device for decrypting encrypted television programs, the decoder device comprising:
    a control unit;
    an input for receiving the encrypted television program;
    a decryption device for decrypting the encrypted television program into a format reproducible by a television set;
    an output capable of being connected to the television set so as to output the decrypted television program to the television set for reproduction;
    a first interface for interfacing to at least one of a first identification and a first key carrier component for enabling the decryption device, the first interface being disposed in the control unit;
    a second interface for interfacing to the control unit;
    a third interface for interfacing to a telecommunications network; and
    a fourth interface for interfacing to at least one of a second identification and a second key carrier component, an authorization by at least one of the second identification and the second key carrier component being useable for establishing a connection to a subscriber via the telecommunications network.

2. The decoder device as recited in claim 1 wherein the fourth interface is disposed in the control unit.

3. The decoder device as recited in claim 1 wherein the television set includes a fifth interface for receiving control commands and wherein the control unit is capable of controlling the television set.

4. The decoder device as recited in claim 1 wherein the first and the second identification and/or key carrier components include a respective smart card or a common smart card.

5. The decoder device as recited in claim 1 further comprising a sixth interface for connecting the decoder device to a computer, the computer being adaptable for at least one of controlling the decoder device and establishing a connection to a subscriber via the telecommunications network.

6. The decoder device as recited in claim 1 wherein the control unit includes a computer, the computer including a seventh interface for controlling the decoder device and including the first and fourth interfaces.

7. The decoder device as recited in claim 1 wherein the decoder device is integrated in the television set.

8. The decoder device as recited in claim 1 wherein the second interface is a keypad operatable by a user.

* * * * *